(12) United States Patent
Kurani

(10) Patent No.: US 11,514,423 B1
(45) Date of Patent: Nov. 29, 2022

(54) SYSTEMS AND METHODS FOR A TRANSACTIONAL KEYBOARD

(71) Applicant: Wells Fargo Bank, N.A., San Francisco, CA (US)

(72) Inventor: Ashish B. Kurani, Hillsborough, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/004,953

(22) Filed: Jun. 11, 2018

Related U.S. Application Data

(60) Provisional application No. 62/624,712, filed on Jan. 31, 2018.

(51) Int. Cl.
| | |
|---|---|
| *G06Q 20/32* | (2012.01) |
| *H04W 4/14* | (2009.01) |
| *H04W 4/24* | (2018.01) |
| *G06F 3/04817* | (2022.01) |

(52) U.S. Cl.
CPC ....... *G06Q 20/322* (2013.01); *G06F 3/04817* (2013.01); *G06Q 20/3255* (2013.01); *H04W 4/14* (2013.01); *H04W 4/24* (2013.01)

(58) Field of Classification Search
None
See application file for complete search history.

(56) References Cited

U.S. PATENT DOCUMENTS

| | | | | |
|---|---|---|---|---|
| 2004/0235450 | A1* | 11/2004 | Rosenberg | G06Q 20/327 455/406 |
| 2005/0165640 | A1* | 7/2005 | Kotorov | G06Q 30/0241 705/14.16 |
| 2007/0268922 | A1* | 11/2007 | Dougan | H04L 12/66 370/401 |
| 2008/0238610 | A1* | 10/2008 | Rosenberg | G06Q 30/0281 340/5.7 |
| 2011/0191250 | A1* | 8/2011 | Bishop | G06Q 20/3821 705/67 |
| 2012/0197740 | A1* | 8/2012 | Grigg | G06Q 20/3278 705/16 |
| 2013/0073448 | A1* | 3/2013 | Wall | G06Q 20/367 705/39 |
| 2014/0122344 | A1* | 5/2014 | Foulds | G06Q 20/3278 705/67 |
| 2014/0358709 | A1* | 12/2014 | Wu | G06Q 20/202 705/21 |
| 2016/0110714 | A1* | 4/2016 | Norland | G06Q 20/10 705/75 |

* cited by examiner

*Primary Examiner* — William J Jacob
(74) *Attorney, Agent, or Firm* — Foley & Lardner LLP

(57) ABSTRACT

A user device includes a digital payment application and a transactional keyboard client application communicatively coupled to the digital payment application. The transactional keyboard client application is structured to receive a user input associated with one or more keys of the transactional keyboard. The transactional keyboard client application activates a digital application feature of the digital payment application based on the user input associated with the one or more keys. Furthermore, the transactional keyboard client application initiates a digital transaction without accessing the digital payment application.

21 Claims, 7 Drawing Sheets

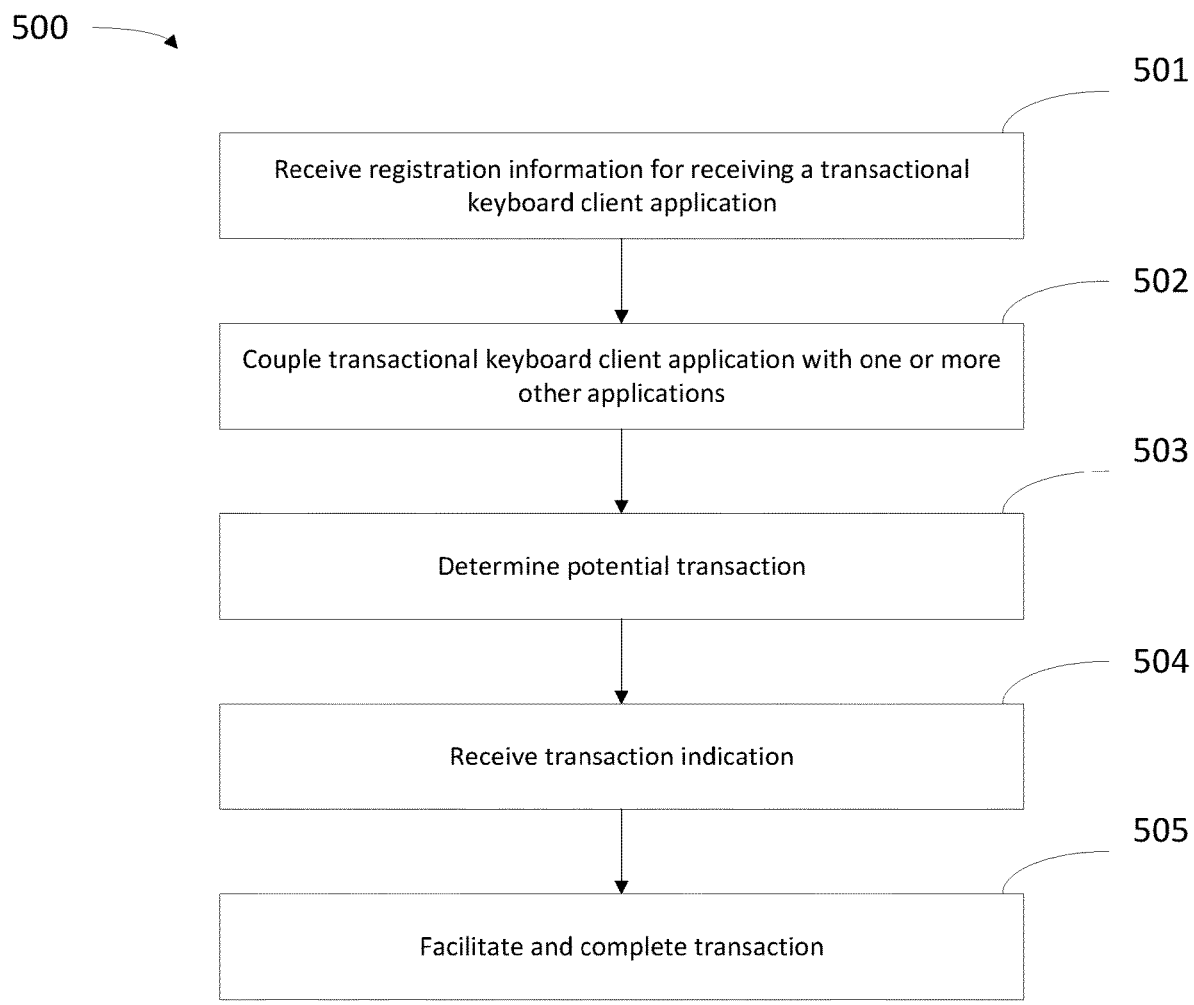

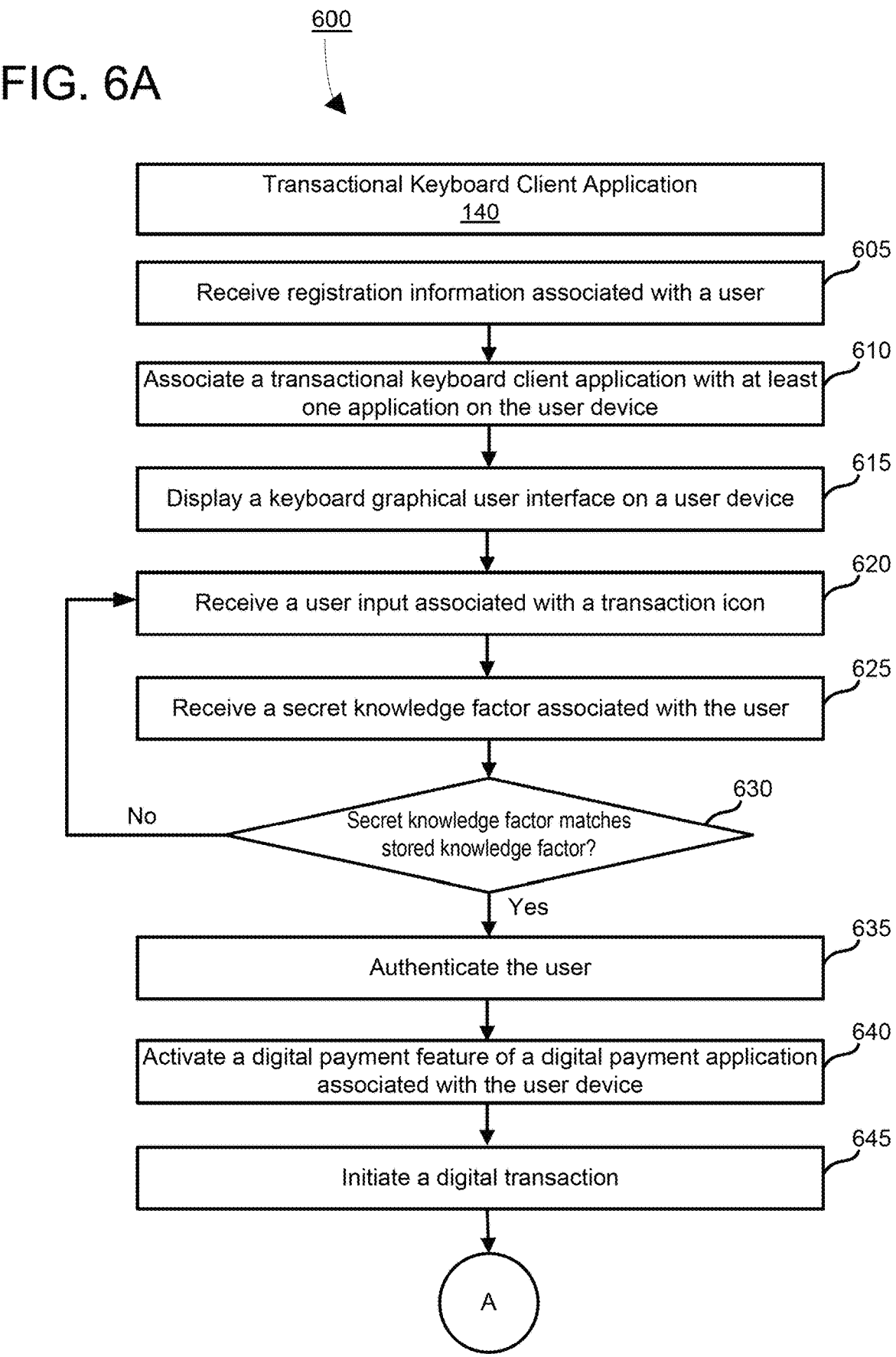

SYSTEMS AND METHODS FOR A TRANSACTIONAL KEYBOARD

CROSS-REFERENCE TO RELATED APPLICATIONS

The present application claims priority to and benefit of U.S. Provisional Patent Application No. 62/624,712, filed Jan. 31, 2018, and entitled "Systems and Methods for a Transactional Keyboard," the entire disclosure of which is incorporated herein by reference.

TECHNICAL FIELD

Embodiments of the present disclosure relate generally to a keyboard for a user device (e.g., a mobile device, such as a smartphone). More particularly, embodiments of the present disclosure relate to an adaptable transactional keyboard that interfaces with other applications on the user device to enable fulfillment of various processes (e.g., a money transfer).

BACKGROUND

In general when making payments, people use cash, checks, or cards by swiping or inserting a card at the point of sale, or using the card information to pay online without using a physical card. In addition to using such modes to make payments, people also use mobile payments which enable the user to make payments via a mobile device. A user typically will enter their card information or account information into their mobile device and then use the mobile device to make purchases.

SUMMARY

One embodiment relates to a user device. The user device includes a digital payment application, and a transactional keyboard client application communicatively coupled to the digital payment application. The transactional keyboard client application is structured to receive a user input associated with one or more keys of the transactional keyboard. The transactional keyboard client application activates a digital application feature of the digital payment application based on the user input associated with the one or more keys. The transactional keyboard client application initiates a digital transaction without accessing the digital payment application.

Another embodiment relates to a computer implemented method of providing a digital application feature via a transactional keyboard client application. The method includes authenticating a user device associated with a digital payment application; receiving a user input associated with one or more keys of the transactional keyboard client application; and activating a digital application feature of the digital payment application based on the user input associated with the one or more keys. A digital transaction is initiated without accessing the digital payment application.

Still other embodiments relate to a method comprising displaying, on a user device associated with a user, a keyboard graphical user interface associated with a transactional keyboard client application. The keyboard graphical user interface comprising at least a transaction icon. The transactional keyboard client application receives via the keyboard graphical user interface, a user input associated with the transaction icon. The transactional keyboard client application activates a digital payment feature of a digital payment application associated with the user device. The transactional keyboard client application initiates a digital transaction without the digital payment application being accessed by the user.

These and other features, together with the organization and manner of operation thereof, will become apparent from the following detailed description when taken in conjunction with the accompanying drawings.

BRIEF DESCRIPTION OF THE FIGURES

These drawings depict only several implementations in accordance with the disclosure and are therefore, not to be considered limiting of its scope, the disclosure will be described with additional specificity and detail through use of the accompanying drawings.

FIG. 5 is a flow diagram of a method providing and using the transactional keyboard client application of FIGS. 1-2, according to an example embodiment.

FIGS. 6A and 6B are schematic flow diagrams of a method for initiating a digital transaction using the transactional keyboard client application of FIGS. 1-2, according to some embodiments.

Figure 1:
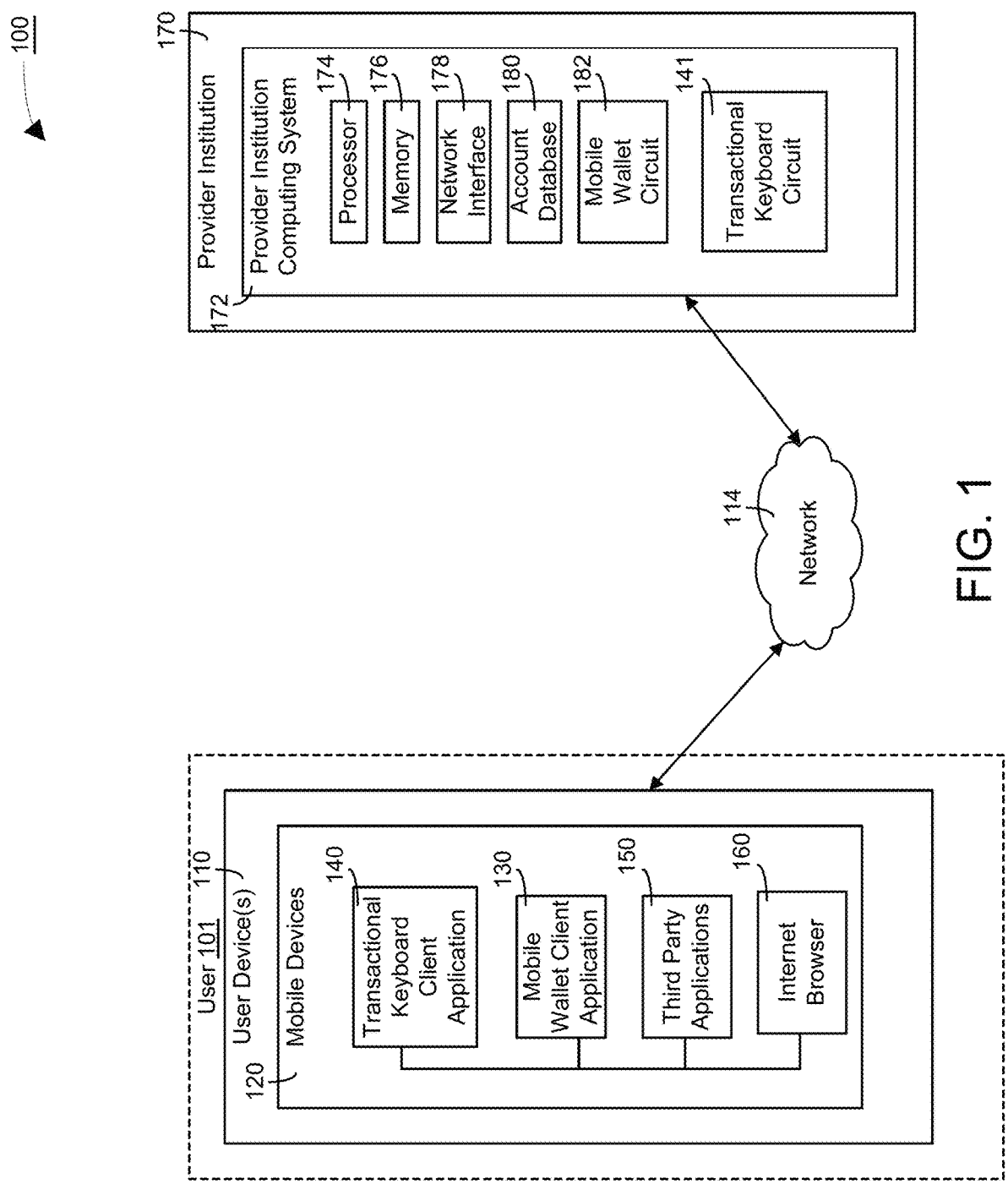
FIG. 1 is a block diagram of computing system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the figures generally, systems and methods of providing a digital application feature via an adaptable transactional keyboard are described. The system includes a user device (e.g., a mobile device such as an iPHONE®, an ANDROID® phone, a WINDOWS® a SYMBIAN® phone, a tablet, a laptop, a desktop computer, a wearable device, a smart TV or other smart device, an IPTV box, etc.) that includes a digital payment application (e.g., a digital wallet, mobile wallet, and/or application associated with a provider institution computing system such as, but not limited to, a provider computer system associated with a financial institution), and a near field communication transceiver communicatively coupled to the digital payment application. The near field communication transceiver is structured to facilitate a digital payment. The user device also includes an adaptable transactional keyboard communicatively coupled to the digital payment application. The adaptable transactional keyboard is structured to receive a user input associated with one or more keys of the adaptable transactional keyboard, and activate a digital application feature of the digital payment application based on the user input associated with the one or more keys.

The adaptable transactional keyboard may include, for example, a digital keyboard (e.g., displayed on the user device as a keyboard graphical user interface (GUI)) or other input component or device structured to engage with a digital payment application associated with a provider institution. The digital payment application may include a mobile wallet client application or be a component thereof. The adaptable transactional keyboard may be coupled to a digital payment application installed on the user device (e.g., digitally coupled to the digital payment application via an application programming interface (API)) and/or a provider institution computing system via a cable and/or wireless connection (e.g., a wireless or internet connection of the user device). In some examples, the adaptable transactional keyboard may take the form of a physical keyboard. In some examples, the adaptable transactional keyboard may be included within and/or accessible via a GUI displayed by the user device. The adaptable transactional keyboard may be structured to include any input device used to enter characters and/or functions into a mobile device and/or any other computer system. In some examples, the adaptable transactional keyboard may be used to provide user input by touching, tapping, pressing, or selecting one or more buttons and/or keys (e.g., physical keys or virtual keys displayed on the user device). In some examples, the adaptable transactional keyboard may include one or more keys for individual letters, numbers, special characters, and/or features (e.g., various functions).

In some examples, the adaptable transactional keyboard may include character keys (e.g., individual keys, letters, numbers and special characters). In some examples, the adaptable transactional keyboard may include navigation keys (e.g., arrows for up, down, left, right), editing keys (e.g., Enter, Delete, Insert), modifier keys (e.g., Control, Shift), function keys (e.g., F1, F2, F3), operating system keys, etc. In some arrangements, the adaptable transactional keyboard may include a single keypad comprising a character keypad and a numeric keypad, while in other arrangements the adaptable transactional keyboard may include a plurality of separate keypads (e.g., numeric keypad separated from the character keypad). In particular embodiments, the adaptable transactional keyboard includes keys or icons configured to perform specific functions such as, for example, a transaction icon or key configured to initiate a transaction and/or a personal information icon or key configured to display at least one user profile including personal information corresponding to a user which may be used to form fill a digital form.

The embodiments and implementations of the systems and methods disclosed herein improve current computing systems by facilitating functioning of a digital application feature via an adaptable transactional keyboard. Using the adaptable transactional keyboard, the identity of a person may be verified to prevent fraudulent activity (e.g., fraudulent payments) and to ensure that each person who interacts with a digital payment application operates under the proper security roles and permissions. These systems, methods, and computer implementations improve such computing systems by facilitating the function of a digital application feature via an adaptable transactional keyboard without requiring the entry of account information during a transaction (e.g., when making a payment) via a near-field communication transceiver. The clock time, processing time, programmatic instructions required to authenticate a user account, and other requirements of the central processing unit, memory utilization, and other system resources are reduced because the function of the application is accomplished without accessing that application but via the adaptable transactional keyboard. Furthermore, the adaptable transactional keyboard provides the convenience to a user of securely initiating a transaction within a third party application without the user having to access or open the digital payment application on the user device. This reduces transaction processing time as well as memory utilization of the user device. Accordingly, authentication and system security are improved.

Advantageously, these systems, methods, and computer implementations enable a user to make payments and/or engage in financial transactions while utilizing an adaptable transactional keyboard without requiring the user to access a payment application, provider account, or physical payment types (e.g., cash, credit cards, etc.). As such, the systems, methods, and computer implementations disclosed herein improve the functioning of such systems and information management by providing functionalities that are novel and non-obvious improvements over current systems.

Referring now to FIG. 1, a block diagram of a computing system 100 is shown according to an example embodiment. As shown, the computing system 100 includes one or more user devices 110 associated with a user 101, and a provider institution 170 having or associated with a provider institution computing system 172. The components of FIG. 1 may be communicably and operatively coupled to each other over a network 114. The network 114 may be any type of type of network. For example, the network 114 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 114 is structured to permit the exchange of data, values, instructions, messages, and the like between and among the user device 110 and the provider institution computing system 172.

The provider institution 170 refers to an entity that provides one or more goods or services. In the example depicted, the provider institution 170 is a financial institution capable of providing one or more financial products and services (e.g., banking (e.g., the providing of various accounts, such as a demand deposit account), lending, money transfers, issuing credit and/or debit cards, wealth management, and so on). Thus, the associated provider institution computing system 172 is structured to provide or otherwise facilitate providing the one or more financial products and services to customers. As such, the provider institution 170 may provide banking services to the customers. For example, the user 101 may deposit funds into accounts, withdraw funds from accounts, transfer funds between accounts, view account balances, and the like via the provider institution computing system 172. As described herein, the provider institution computing system 172 is structured to support at least some of the functions and services described below. As depicted, the provider institution computing system 172 is a backend computer system that supports the user device 110 and other services offered by the provider institution 170, e.g., financial services offered by the provider institution 170.

As shown, the provider institution computing system 172 includes a processor 174 and a memory device 176. The processor 174 may be implemented as a general-purpose processor, an application specific integrated circuit (ASIC), one or more field programmable gate arrays (FPGAs), a digital signal processor (DSP), a group of processing components (e.g., servers), or other suitable electronic processing components. The one or more memory devices 176 (e.g., RAM, ROM, NVRAM, Flash Memory, hard disk storage, etc.) may store data and/or computer code for facilitating at least some of the various processes described herein. In this regard, the memory 176 may store programming logic that, when executed by the processor 174, control the operation of the provider institution computing system 172.

The provider institution computing system 172 also includes a network interface 178. The network interface 178 facilitates the sending and receiving of data, information, and/or communications over the network 114 (e.g., to and from the user device 110, etc.). As mentioned above, in this example, the provider institution 170 is structured as a financial institution. As such, the provider institution computing system 172 may also include an account database 180 that stores customer information and account information relating to accounts held with the financial institution.

The account database 180 is structured to maintain accounts associated with customers of the provider institution 170 and to facilitate transactions associated with the accounts. The account database 180 may store transaction data and account information, including account numbers, account balances, customer contact information, customer preferences, and other account information. As used herein, the term "transaction data" may be used to refer to data associated with a transaction including, but not limited to, a payment, expense, debit, credit, contribution, donation, etc. which may be associated with the account of a user of the provider institution 170.

As shown, the provider institution computing system 172 also includes a mobile wallet circuit 182. The mobile wallet circuit 182 is structured to permit, enable, facilitate, manage, process, and/or otherwise allow mobile wallet transactions. As used herein, the term "mobile wallet transaction" is meant to be broadly interpreted to refer to transactions accomplished via a mobile wallet client application 130 on the user mobile device 120. As such, the mobile transaction may include, but is not limited to, a person-to-person payment, a payment for a good or service at a point-of-sale terminal of a merchant, funds transfer between accounts, etc. As shown, the mobile wallet circuit 182 is a part of the institution provider computing system 172. In other embodiments, the mobile wallet circuit 182 may be owned by, associated with, or otherwise operated by a third party relative to the provider institution 170.

The mobile wallet circuit 182 may include a database that is structured to store information regarding mobile wallet accounts held by various users, such as a mobile wallet account held by the user of the user mobile device 120. For instance, the mobile wallet database may store various forms of information related to the user and/or an associated mobile device upon registration of one or both for a mobile wallet. The stored mobile wallet account information may include authentication information (e.g., username/password combinations, device authentication tokens, security question answers, etc.), payment card information, and transaction history, account holder identifying information, registered device information, and any other information that may be encountered in the operation of a mobile wallet account or otherwise referenced herein. Such information may include user preferences and other information comprising a user profile.

In some arrangements, mobile wallet database also includes or is coupled to a token vault. The token vault may include a lookup table maintaining tokens associated with various user payment vehicles. The tokens stored therein may be generated internally (e.g., at the provider institution computing system 172) or by other entities (e.g., a token service provider institution computing system 172). For example, in one embodiment, the token vault may include a lookup table including tokens that that have been randomly assigned to a user payment vehicle (e.g., user lines of credit, user checking accounts, and the like). In some arrangements, the provider institution computing system 172 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer. In some arrangements, the token vault is provided at a computing system associated with a separate entity.

The mobile wallet circuit 182 is structured to provide a mobile wallet on the user mobile device 120. The mobile wallet circuit 182 is structured to provide a mobile wallet client application (e.g., mobile wallet client application 130 discussed below) on the user mobile device 120. In this regard, the mobile wallet circuit 182 enables registrations of a user for a mobile wallet, presents the user with various user interfaces enabling user to use or manage a mobile wallet, and enables users to perform transactions using the mobile wallet.

The user 101 may have or be associated with a user device 110. The user 101 may include individuals, business representatives, large and small business owners, and any other entity/person. In some configurations, the user 101 may have a financial account at the provider institution 170 of the system 100. The user device 110 may be or include a mobile device 120 (i.e., a device that is substantially portable or movable as opposed to a stationary or fixed device). The mobile device 120 may include a wearable device. Wearable devices refer to any type of device that a user wears including, but not limited to, a watch (e.g., a smart watch), glasses (e.g., eye glasses, sun glasses, smart glasses, etc.), bracelet (e.g., a smart bracelet), etc. Mobile devices 120 may also include any type of mobile device of a user 101 including, but not limited to, a phone (e.g., a smartphone, etc.) and a computing device (e.g., a tablet computer, a laptop computer, a person digital assistant, etc.). Mobile devices 120 may also include voice-activated digital assistance devices (e.g., a voice activated device structured to assist a user, smart speakers having chat bot capabilities, etc.), portable media devices, vehicle infotainment systems, etc. that may access one or more programs, servers, networks, central computers, etc. Accordingly, the user device 110 may include a display device (e.g., a screen) and one or more input/output devices (e.g., a touch screen, microphone, speaker, keyboard, etc.). In the example depicted, the mobile device 120 is structured as a smartphone.

In this example, the user device 110 includes a mobile wallet client application 130, transactional keyboard client application 140, one or more third party applications 150 (e.g., a messaging service, an educational application, a financial application, a game, etc.), and an internet browser 160. The mobile wallet client application 130, transactional keyboard client application 140, one or more third party applications 150, and internet browser 160 may be server-based applications executable on the user device 110. In this regard, a user may have to first download the application(s) prior to their usage. In another arrangement, the mobile wallet client application 130, the transactional keyboard client application 140, the one or more third party applications 150, and the internet browser 160 may be hard coded into the memory of the user device 110.

In an alternative embodiment, at least one of the mobile wallet client application 130, the transactional keyboard client application 140, the one or more third party applications 150, and the internet browser 160 may be web-based interface applications. In this configuration, the user may have to log onto or access the web-based interface before usage of the application(s). At least one of the mobile wallet client application 130, the transactional keyboard client application 140, the one or more third party applications 150, and the internet browser 160 may be at least partly supported by a separate computing system comprising one or more servers, processors, network interface modules, etc. that transmit the applications for use to the user device 110.

In yet another alternative embodiment, the mobile wallet client application 130, the transactional keyboard client application 140, the one or more third party applications 150, and the internet browser 160 may include their own set of dedicated hardware components or substantially dedicated hardware components and associated logic. To facilitate integration, the mobile wallet client application 130, the transactional keyboard client application 140, the one or more third party applications 150, and the internet browser 160 may include an application programming interface (API) and/or a software development kit (SDK) that facilitate the integration of other applications with at least one of the mobile wallet client application 130, the transactional keyboard client application 140, the one or more third party applications 150, and the internet browser 160. All such variations and combinations are intended to fall within the spirit and scope of the present disclosure.

The mobile wallet client application 130 may be communicably coupled to the provider institution computing system 172 (e.g., the mobile wallet circuit 182) via the network 114 and may be structured to facilitate purchases by the user via the mobile wallet client application 130. Accordingly, the mobile wallet client application 130 may be linked or otherwise connected with one or more accounts of the user. In this regard and as described above, the mobile wallet client application 130 may be at least partly supported by the mobile wallet circuit 182. In operation, when at a point-of-sale terminal, a user may open the mobile wallet client application 130 and provide at least one secret knowledge factor (e.g., a biometrics such as a thumbprint, a face scan, a retina scan, a hand gesture, a facial gesture, a personal identification number (PIN), a password, a passcode, etc.) to authenticate the person and select the source payment account desired (e.g., a checking account from a particular financial institution that is linked to the mobile wallet client application 130). In response to the secret knowledge factor matching a stored knowledge factor (e.g., a biometric a PIN or a password stored in the mobile wallet client application 130, the mobile wallet circuit 182 or the account database 180) the user is authenticated. Via communication with the payment terminal (e.g., via near field communication, Bluetooth, etc.), the aforementioned payment information may be provided and the payment processed. Beneficially, carrying payment cards may be avoided or reduced via the mobile wallet client application 130. Thus, it should be appreciated that the user device 110 includes a NFC transceiver and associated controller for managing NFC exchanges of information.

The mobile wallet client application 130 is structured to permit mobile wallet users to engage in transactions through the initiation of communications with, for example, a merchant point of sale device. In this regard and as mentioned above, the mobile device 120 includes a near field communications (NFC) chip and an associated controller that configures the chip to exchange information with the merchant point of sale device (e.g., an NFC reader). It should be understood that the role that the mobile wallet client application 130 takes in payment transactions will depend on the implementation of the mobile wallet. In some arrangements, for example, the mobile wallet is implemented in a secure element framework. In such arrangements, the user mobile device 120 includes a secure element that is separate from the main system memory of the user mobile device 120. The secure element may include any element having smart card functionalities, such as a universal subscriber identity circuit (a SIM card) or a secure digital card. In various other arrangements, the user-specific payment information may be stored in a trusted execution environment ("TEE") within a processor the user mobile device 120. In these arrangements, user authentication information (e.g., payment vehicle information, user PINS, and the like) is stored in the secure element. In various arrangements, the secure element of the mobile device 120 may include a payment application that interfaces with the NFC chip of the user device responsive to receiving a communication (e.g., an application protocol data unit) from the merchant point of sale device to enable user payment information (e.g., a token) be transferred. In such arrangements, no user information is transferred by the mobile wallet client application 130 to the NFC chip. After user payment information is transmitted to the merchant point of sale device, the mobile wallet client application 130 may query the secure element for transaction data to notify the user of the completed transaction.

In other arrangements and in the example depicted, the mobile wallet client application 130 may operate under a host card emulation framework. In such arrangements, user payment information is maintained within the mobile wallet client application 130 or cloud-based environment (e.g., a host emulation service or the mobile wallet circuit 182) rather than in the secure element. The user payment information refers to the tokenized payment card information, which was described above. Thus, sensitive payment information is not stored by the mobile device 120 or application to improve security of this information. In operation, the mobile wallet client application 130 may include a service component (e.g., a payment application) configured to interface with the NFC chip of the mobile device 120 to communicate user payment tokens to the merchant point of sale device.

In some arrangements, the mobile wallet client application 130 is structured to enable the user to manage a mobile wallet. In this regard, the mobile wallet client application 130 is structured to present, control, and otherwise manage displays or graphical user interfaces on the mobile device 120 including information pertaining to various payment vehicles. For example, the mobile wallet client application 130 may present the user with displays enabling the user to input information pertaining to various payment vehicles. The screens may enable the user to manually input information (e.g., a PAN) pertaining to a payment vehicle, or enable the user to take a picture of a payment vehicle. The mobile wallet client application 130 may then process the information input by the user, identify account information, and transmit the information to the provider institution computing system 172 for storage (e.g., in the mobile wallet circuit 182 in association with the user). Once information pertaining to various payment vehicles (e.g., payment cards) has been received by the provider institution computing system 172, the mobile wallet client application 130 is configured to present displays that enable the user to select a payment vehicle from amongst a plurality of payment vehicles. Once a payment vehicle is selected, the displays may further enable the user to perform various actions using the selected payment vehicle (e.g., use the selected vehicle to complete a mobile wallet transaction, manage an account at a financial institution associated with the selected payment vehicle, view a transaction history associated with the payment vehicle, and the like).

While described above primarily with respect to point of sale transactions, such a configuration is not meant to be limiting for the mobile wallet client application 130. Rather and in the example shown, the mobile wallet client application 130 is configured like the mobile wallet client application 112 of U.S. patent application Ser. No. 15/604,395, filed May 24, 2017, which is incorporated herein by reference in its entirety. As such, it is appreciated the mobile wallet client application 130 is structured as a multi-function mobile wallet that includes peer-to-peer payment capabilities and/or the ability to interface with third party applications (e.g., a driving service application, such as Uber®). Further, various third party applications and functions may be built into the mobile wallet client application 130, which are described in the aforementioned applications.

As shown, the mobile device 120 also includes third party applications 150 and internet browser 160. The third party applications 150 refer to product or service applications offered by a third party (relative to the mobile wallet client application 130) that are installed or provided on the mobile device 120. Examples of third party applications 150 include, but are not limited to, merchant applications, text messenger applications, music applications, map applications, social media applications, and so on.

The internet browser 160 refers to the browser application that is capable of connecting and using the internet on the mobile device 120. Thus, the internet browser 160 may include, but is not limited to the internet explorer browser, the chrome browser, the safari browser, the firefox browser, the opera browser or any other web browser.

As shown, the transactional keyboard client application 140 is a separate component relative to the mobile wallet client application 130, third party applications 150, and internet browser 160. In this embodiment, the transactional keyboard client application 140 is a downloadable application as described above. In this regard, the provider institution computing system 172 (i.e., the transactional keyboard circuit 141) may at least partially support the activities and functions of the transactional keyboard client application 140. The transactional keyboard client application 140 is structured to included one or more application programming interfaces (APIs) that enable the transactional keyboard client application 140 to communicate (e.g., exchange information) with other devices and applications (e.g., the internet browser 160, mobile wallet client application 130, third party applications 150). The type and number of APIs is highly configurable and customizable in order to enable communication with a high variety of devices and applications. The transactional keyboard client application 140 also includes a keyboard generator structured to generate and provide a keyboard graphical user interface (GUI). In other embodiments and as described herein, a different structural configuration may be implemented. For example, the transactional keyboard client application 140, or at least parts thereof, may be provided with the user device. In this configuration, processing components and input/output devices may be utilized with the transactional keyboard client application 140 (e.g., a hardware keyboard, one or more memory devices, one or more processing components, etc.).

The transactional keyboard client application 140 may be installed on the user device 110 once the user registers or enrolls in a transactional keyboard client application program. For example, the provider institution computing system 172 (e.g., the transactional keyboard circuit 141) may communicate a request to the user to enroll in the transactional keyboard client application program. In response to the user agreeing to enroll in the transactional keyboard client application program, the transactional keyboard circuit 141 may communicate the transactional keyboard client application 140 via the network 114 to the user device 110.

The user device 110 may download and install the transactional keyboard client application 140 on the user device 110. In some arrangements, transactional keyboard client application 140 may request the user to provide registration information associated with the user. For example, the registration information may include personal information corresponding to the user (e.g., user name, password, account information, address, phone number, email, transaction settings such as monetary limits, etc.) and/or one or more third party applications 150 for associating the transactional keyboard client application 140 with. The transactional keyboard client application 140 may then be associated with at least one application on the user device 110 based on the registration information (e.g., one or more third party applications 150 indicated by the user for associating the transactional keyboard client application 140 with). Such applications may include but are not limited to a short message service (SMS) message, an application interface, a web browser or an electronic document As described herein below, the keyboard GUI through the transactional keyboard client application 140 is structured to interface with the mobile wallet client application 130, third party applications 150, and internet browser to provide a transactional function to a user of the mobile device 120. The transactional function or quick transaction feature enables the user to perform a transaction, such as transfer money to another person (i.e., a peer-to-peer payment) or point of sale device (e.g., as part of a mobile wallet transaction) without the user having to leave the keyboard GUI.

Figure 2:
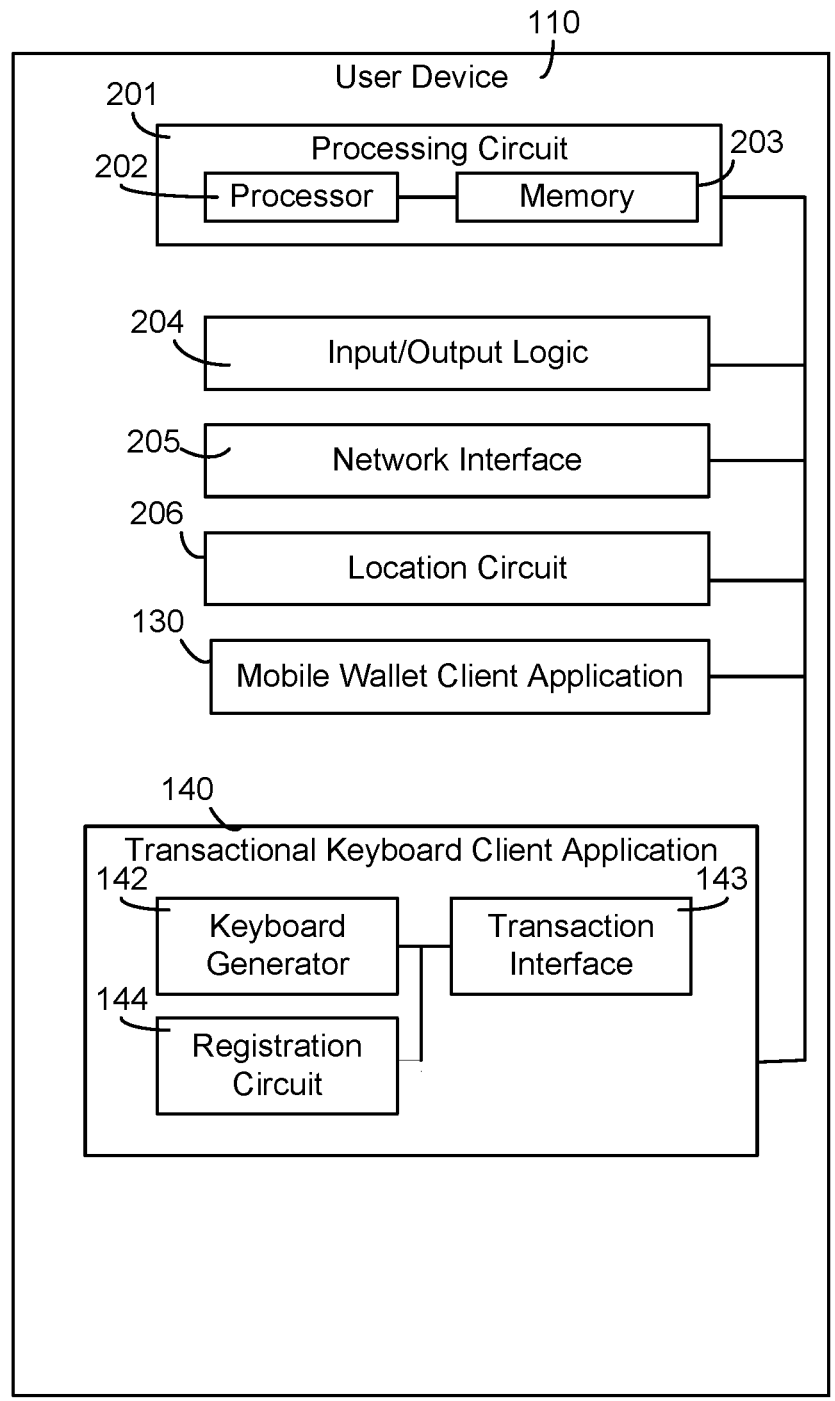
FIG. 2 is a block diagram of the user device of FIG. 1, according to an example embodiment.

Turning now to FIG. 2, a block diagram of the user device 110 is shown according to an example embodiment. As mentioned above, in this example, the user device 110 is a mobile device 120 that is structured as a smartphone. The user device 110 includes a processing circuit 201 having a processor 202 and one or more memory devices 203. The processor 202 may be implemented as a general-purpose processor, an application specific integrated circuit (ASIC), one or more field programmable gate arrays (FPGAs), a digital signal processor (DSP), a group of processing components that may be distributed over various geographic locations in the user device, or other suitable electronic processing components. The one or more memory devices 203 (e.g., RAM, NVRAM, ROM, Flash Memory, hard disk storage, etc.) may store data and/or computer code for facilitating at least some of the various processes described herein. The one or more memory devices 203 may be or include tangible, non-transient/non-transitory computer readable medium, volatile memory or non-volatile memory. Accordingly, the one or more memory devices 203 may include database components, object code components, script components, or any other type of information structure for supporting at least some of the various activities and information structures described herein.

The user device 110 is shown to include various circuits and logic for completing at least some of the activities described herein. More particularly, the user device 110 includes input/output logic 204, a network interface 205, a location circuit 206, the mobile wallet client application 130, third party applications 150, the internet browser (not shown), and the transactional keyboard client application 140. While various circuits, interfaces, and logic with particular functionality are shown in FIG. 2, it should be understood that the user device 110 may include any number of circuits, interfaces, and logic for completing the functions described herein. For example, the activities of multiple circuits may be combined as a single circuit, as additional circuits with additional functionality may be included, etc.

The network interface 205 is adapted for and structured to establish a communication session via the network 114 with various devices and/or systems, such as the provider institution computing system 172. Accordingly, the network interface 205 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Further, the network interface 205 may include cryptography capabilities to establish a secure or relatively secure communication session with the provider institution computing system 172. In this regard, data may be encrypted to prevent or substantially prevent the threat of hacking.

The input/output logic 204 may be structured to receive and provide communication(s) to a user of the device 110 (or, to another entity such as the provider institution computing system 172). In this regard, the input/output logic 204 may be structured to exchange data, communications, instructions, etc. with an input/output component of the device 110. Accordingly, in one embodiment, the input/output logic 204 may include an input/output device such as a display device, a touchscreen, and a microphone. In another embodiment, the input/output logic 204 may include communication circuitry for facilitating the exchange of data, values, messages, and the like between an input/output device and the components of the user device 110 (e.g., the transactional keyboard client application 140). In yet another embodiment, the input/output logic 204 may include machine-readable media for facilitating the exchange of information between the input/output device and the components of the user device 110. In still another embodiment, the input/output logic 204 may include any combination of hardware components (e.g., a touchscreen, speakers, notification LEDs, microphones, buttons, switches, cameras, and so on), communication circuitry, and machine-readable media.

The location circuit 206 may be structured to receive or acquire location data, and determine a location of the user device 110 based on the location data. In one embodiment, the location circuit 206 may include a global positioning system (GPS) or any other type of location positioning system. As such, the location circuit 206 may receive latitude data, longitude data, and any other type of location or position data to determine the location of the user device 110. In other embodiments, the location circuit 206 may receive explicit location identification from the user of the device 110. All such variations are intended to fall within the spirit and scope of the present disclosure.

As mentioned above, the mobile wallet client application 130 may be structured to facilitate and permit transactions (e.g., payments) by interfacing with an account (e.g., a checking account) held by the user at a financial institution. Accordingly, the mobile wallet client application 130 may be communicably coupled via the network interface 205 over the network 114 to the provider institution computing system 172.

While not shown, the user device 110 includes a power source. The power source may include grid power, battery power (e.g., alkaline batteries, rechargeable batteries, etc.), and/or another energy source. As being configured as a smartphone, the user device includes circuitry structured to recharge the battery (i.e., the power source).

Turning now to the transactional keyboard client application 140, as described herein, the transactional keyboard client application 140 is structured to enable quick transaction capabilities directly from the keyboard generated and provided from the transactional keyboard client application 140. As shown, the transactional keyboard client application 140 includes a keyboard generator 142, a transaction interface 143, and a registration circuit 144. As mentioned above and in the example depicted, the transactional keyboard client application 140 is structured as a downloadable application configured or structured to run on the user device 110. As such, the components of the transactional keyboard client application 140 are embodied as machine or computer-readable media that is executable by a processor, such as the processor 202.

As described herein and amongst other uses, the machine-readable media facilitates performance of certain operations to enable reception and transmission of data. For example, the machine-readable media may provide an instruction (e.g., command, etc.) to, e.g., acquire data from a particular a physical sensor or a virtual sensor. In this regard, the machine-readable media may include programmable logic that defines the frequency of acquisition of the data (or, transmission of the data). The computer readable media may include non-transitory computer readable media, such as code, which may be written in any programming language including, but not limited to, Java or the like and any conventional procedural programming languages, such as the "C" programming language or similar programming languages. In other embodiments and as described above, the circuits of the engagement system client application may be hardware components or a combination of hardware and logic components. For example, the components of the transactional keyboard client application 140 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." Both variations are intended to fall within the scope of the present disclosure.

The registration circuit 144 is structured to enable registration of the transactional keyboard client application 140 with the transactional keyboard circuit 141. As a result, the transactional keyboard circuit 141 may include a database of account information for users who download and install the transactional keyboard client application 140. The registration circuit 144 is structured to provide one or more GUIs that enable registration of the transactional keyboard client application 140 with the transactional keyboard circuit 141. The registration information may be communicated over the network 114 using the network interface of the user device to the provider institution computing system 172 and, particularly, the transactional keyboard circuit 141. Registration information may include information regarding the user's name, address, date of birth, a username, a password, date of birth, and the like. Registration information may also include credentials (e.g., username and password, passcode, etc.) for, e.g., third party applications 150 (e.g., email applications, etc.) and the mobile wallet client application 130. Thus, due to the APIs and the receipt of credential information, the transactional keyboard client application 140 may interface and communicate with these applications. In other embodiments, the registration circuit 144 may also be configured to receive and store registration information from the user, for example, during an enrolling process of the user in the transactional keyboard client application program, as previously described herein.

The keyboard generator 142 is structured to generate a keyboard GUI on the user device 110. In the example described herein, the keyboard GUI is a QWERTY keyboard. In other examples and for different jurisdictions, the keyboard GUI may be foreign based to account for different languages. In the example shown, the keyboard generator 142 is structured to generate and provide a keyboard GUI on the user device 110. In this regard, the keyboard generator 142 is structured to interface with existing applications (e.g., text messenger application) on the user device 110 and downloaded applications (e.g., third party applications 150). For example, an API included with the transactional keyboard client application 140 interfaces with the input/output logic 204 of the mobile device 120 in such a way that whenever or mostly whenever a keyboard function is called, generated, or activated, the generated keyboard GUI is provided in place of an existing keyboard GUI. Of course, the frequency within which the generated keyboard GUI is provided in place of an existing keyboard is controlled at least partly on the registration information provided and security features of the existing applications, third party applications 150, or based on user preferences indicated by the user during the registration process. For example, the mobile wallet client application 130 may permit or prohibit the keyboard GUI from being provided. As another example, the existing text messaging application may permit or prohibit the keyboard GUI from being provided. According to the present disclosure, one technical benefit is that the functions described below may be provided via the keyboard GUI without the user having to access a specific transaction application (e.g., mobile wallet).

In operation, when a user opens up a third party application or an existing application (e.g., the text messenger application) and a keyboard function is used, the keyboard GUI from the keyboard generator 142 is provided. As a result, inputs, messages, and the like provided by the user or received by a recipient (for example, when used in a text messaging application) is exchanged via the keyboard GUI such that the transactional keyboard client application 140 is an intermediary for such communications. In some embodiments, these communications are transmitted or provided to the transactional keyboard circuit 141. The transactional keyboard circuit 141 may utilize this information in a variety of ways, such as determining when transactions may occur. For example, if other users typically perform a transaction when, e.g., a text message includes "Ok, I'll send you the money soon."

The transaction interface 143 is structured to provide a transaction icon or feature from within the keyboard GUI. The transaction icon is structured to enable transactions from within the keyboard GUI. The transaction icon may be a button or other icon provided on the keyboard GUI. The transaction icon may be passcode entered via the keyboard GUI (e.g., a string of alpha, special characters, emojis, or alpha numeric characters) that enables the transaction.

The transaction interface 143 includes smart capabilities structured to determine the type of transaction that may or is scheduled to occur. In the exemplary embodiment described herein, the "transaction" refers to a financial transaction, which may include, but is not limited to, a peer-to-peer money transfer, a mobile wallet transaction, a banking transaction (e.g., depositing of funds in a demand deposit account of a user), and the like. The transaction interface 143 is structured to determine the type of transaction based on at least one of information regarding previous transactions of the users, location data, transactions from other users (which may be stored in the transactional keyboard circuit 141), and/or context information which may be included in the previous transaction information. Thus, any one or combination thereof may be utilized. A few non-limiting examples are provided below.

In some embodiments, the user and the mobile device 120 may be in a physical merchant location. This determination may be based on location data provided by the location circuit 206 to the transaction interface 143. In this regard, the location circuit 206 may utilize maps or GPS function to retrieve the identity of places/locations associated with the coordinates of the mobile device 120. Based on this information, the transaction interface 143 determines that the user is at a merchant location.

Context information indicative of a transaction or a potential transaction includes when the user is text messaging with another person and messages include information regarding the transfer of money. For example, a conversation may include the user receiving messaging that indicates that he/she owes $X for fantasy football and the user's response of "ok." Other user information may be utilized when explicit messages are not included. For example, the contextual information may simply indicate that the user has agreed to participate in football without an explicit mention of the cost. Other user information may indicate that typical participation requires some type of cost.

Context information may also be provided via the internet browser. For example, the user may be browsing a website of the merchant, which may indicate a potential transaction (e.g., purchase for a good or service). As another example, the user may have accessed a bank's website via the internet browser or via a dedicated third party application of the bank. In either situation, the transaction interface 143 may determine that a transaction is likely forthcoming.

The transaction interface 143 may be structured to receive via a text to speech engine, a user input (e.g., a voice input, command, voice trigger, voice key, etc.), and the like, information indicative of a transaction and/or a need to engage the digital payment application (or another application that is utilized to accomplish the transaction) when the keyboard GUI is in use in real-time or near real-time. For example, the transaction interface 143, may receive user input (e.g., a voice command provided via talk to text). The voice command may be received by an input/output device (e.g., the user input/output logic 204 such as a microphone) when the user uses a SMS message, in-app message, or other system, application, etc. structured to receive or otherwise recognize speech and, thereby, generate text. The transaction interface 143 may receive user input in response to the microphone of the user device 110, for example, receiving the voice command "pay now," "transfer funds," "send money," or other like commands. In turn, the transaction interface 143 may recognize that the user may be engaged in a transaction (e.g., a transaction to send funds to a recipient) based on the user input (e.g., the voice command).

In some examples, the transaction interface 143 may be structured to receive a voice input (e.g., a voice command) structured to move the receipt of user input between one or more fields associated with a message, digital form (e.g., an ecommerce checkout), etc. The voice input may be received by a microphone, or other input device that may be structured to interact with the transaction interface 143.

Upon identification of a potential transaction, the transaction interface 143 may determine a type of transaction. The type of transaction refers what the transaction is likely to be. For example, when the transaction interface 143 determines that the user is at a physical merchant location, the type of transaction may be a mobile wallet transaction. As another example, when the transaction interface 143 determines that the user is text messaging another person regarding a money transfer, the transaction interface 143 determines that a likely transaction is a peer-to-peer transfer. As still another example, if the user is text messaging a person and the information indicates that he she needs to make a deposit, the transaction interface 143 determines that the transaction is likely a deposit. As still another example, when the transaction interface 143 determines that the user is browsing a merchant's website, the transaction interface 143 may determine that an ecommerce transaction is likely.

Upon identification of the type of transaction, the transaction interface 143 may interface or communicate with the appropriate device, application, and/or component to facilitate the transaction when instructed (e.g., the mobile wallet client application 130 and the NFC chip). For example, if a mobile wallet transaction is determined, the transaction interface 143 may communicate with the mobile wallet client application 130. If a peer-to-peer transaction is determined, the transaction interface 143 may communicate with a peer-to-peer transaction application (e.g., the one or more third party applications 150). If a deposit transaction is determined, the transaction interface 143 may communicate with a banking application. If an ecommerce transaction is determined, the transaction interface 143 may communicate with a checkout application provided via the internet browser. Beneficially and as described above, the transaction interface 143 may access many of these functions due to the multi-function mobile wallet incorporated herein by reference and described herein above.

In some arrangements, the transactional keyboard client application 140 may also be configured to recognize a plurality of fields (e.g., name, address, phone number, email, transaction amount, etc.) of a digital form being displayed on the user device 110 (e.g., within a web browser) and configured to form fill the form based on field recognition and automatic form fill matching. In particular arrangements, the keyboard GUI generated by the keyboard generator 142 may include a personal information icon. The user may select or engage the personal information icon which may cause the registration circuit 144 to display at least one user profile associated with the user (e.g., provided by the user during the registration process). The user may select a particular user profile of the at least one user profile, and the registration circuit 144 may form fill the plurality of fields with information corresponding to the selected user profile.

In some arrangements, the transactional keyboard client application 140 is further configured to receive at least one secret knowledge factor prior to displaying the at least one user profile. For example, once the user clicks or presses the personal information icon, the registration circuit 144 may generate a dialog box (e.g., via the keyboard generator 142) requesting the user to enter at least one knowledge factor, for example, a secret knowledge factor (e.g., a PIN, a password) and/or a biometric. In response to the at least one secret knowledge factor matching a stored knowledge factor, the registration circuit 144 may authenticate the user so as to enable the registration circuit 144 to form fill the digital form with information corresponding to the selected user profile.

Based on the foregoing, an example of operation may be described as follows. In this regard, referring now to FIG. 3, a keyboard GUI 300 provided by the keyboard generator 142 is shown according to an example embodiment. As shown, the keyboard GUI 300 includes a keyboard and a transaction icon, shown as a pay button or icon 302. As described above, in other embodiments, a passcode may be utilized instead of or in addition to the transaction icon.

Using location data, the transaction interface 143 determines that a mobile wallet transaction is likely. In combination, the user may be text messaging a friend, a colleague, etc. using the keyboard GUI 300. When the user approaches the point of sale terminal, the user can click, activate, or otherwise select the pay button 302 from within the text messaging environment. The transaction interface 143 interfaces with the mobile wallet client application 130 to enable a mobile wallet transaction at the point of sale, whereby the user may now simply NFC tap (or any other mobile wallet communication technology, such as magnetic card data transmission) the point of sale to complete the transaction all without opening the mobile wallet client application 130. The amount of transaction may be displayed as a pop-up over the keyboard GUI 300, such that the user can simply click yes or no (or similar type of go-no go instructions) to then complete the mobile wallet transaction at that amount. The mobile wallet transaction may be tracked via the mobile wallet client application 130.

As another example, the text messaging data (i.e., context information) may indicate that the user just texted a friend saying they need to make a deposit. From within the text messaging conversation, the user may click the pay button 302, which generates an additional screen asking the user whether he/she would like to deposit funds. If he/she clicks yes, the user may select the bank identity, account information, and deposit amount. Again, such quick transaction capabilities may be provided all within the text messaging application using the keyboard GUI 300 without the user having to access the particular banking application or website.

As still another example, the user may indicate via a text message to send $X to the recipient of the text messages. The transaction interface 143 may communicate with a third-party peer-to-peer money transfer application or with the mobile wallet client application 130 which includes peer-to-peer money transfer capabilities, whereby upon the user selecting the pay button 302, the peer-to-peer payment be initiated. In this regard, one or more screens may be provided as a pop-up (message 310) overlay over the text messaging asking whether he/she would like to send money to this person, when the transfer should occur, the amount, and any other information required to complete the transfer. Assuming the user wishes to continue and provides the appropriate confirmations, the peer-to-peer transfer is completed.

Thus, in each of these examples, the transactional keyboard client application 140 communicates with the relevant application (e.g., third party application 150, mobile wallet client application 130, etc.) to enable and facilitate the transaction. These capabilities may be based on the registration process whereby security credentials for these applications are provided that enable their later usage via the keyboard GUI 300. In another embodiment, the transactional keyboard client application 140 may be provided as part of the mobile wallet client application 130, such that communication with this application may be avoided thereby leading to quick transactions, less bandwidth, and faster processing times of desired transactions.

In some embodiments, one or more security protocols may be implemented with the transaction. For example, after a peer-to-peer transaction is initiated, the user may be required to provide a security credential (e.g., a passcode, a biometric, etc.). For example, during the peer-to-peer transaction, the user may provide a passcode via the keyboard GUI 300 to authenticate them and enable the transaction. In another embodiment, a passcode may be utilized with the transactional keyboard client application 140 such that when the user enters the passcode or other security information (e.g., a biometric), the user is authenticated into the other applications thereby alleviating the need for certain security credentials that may otherwise be required as part of the transaction.

Figure 3:
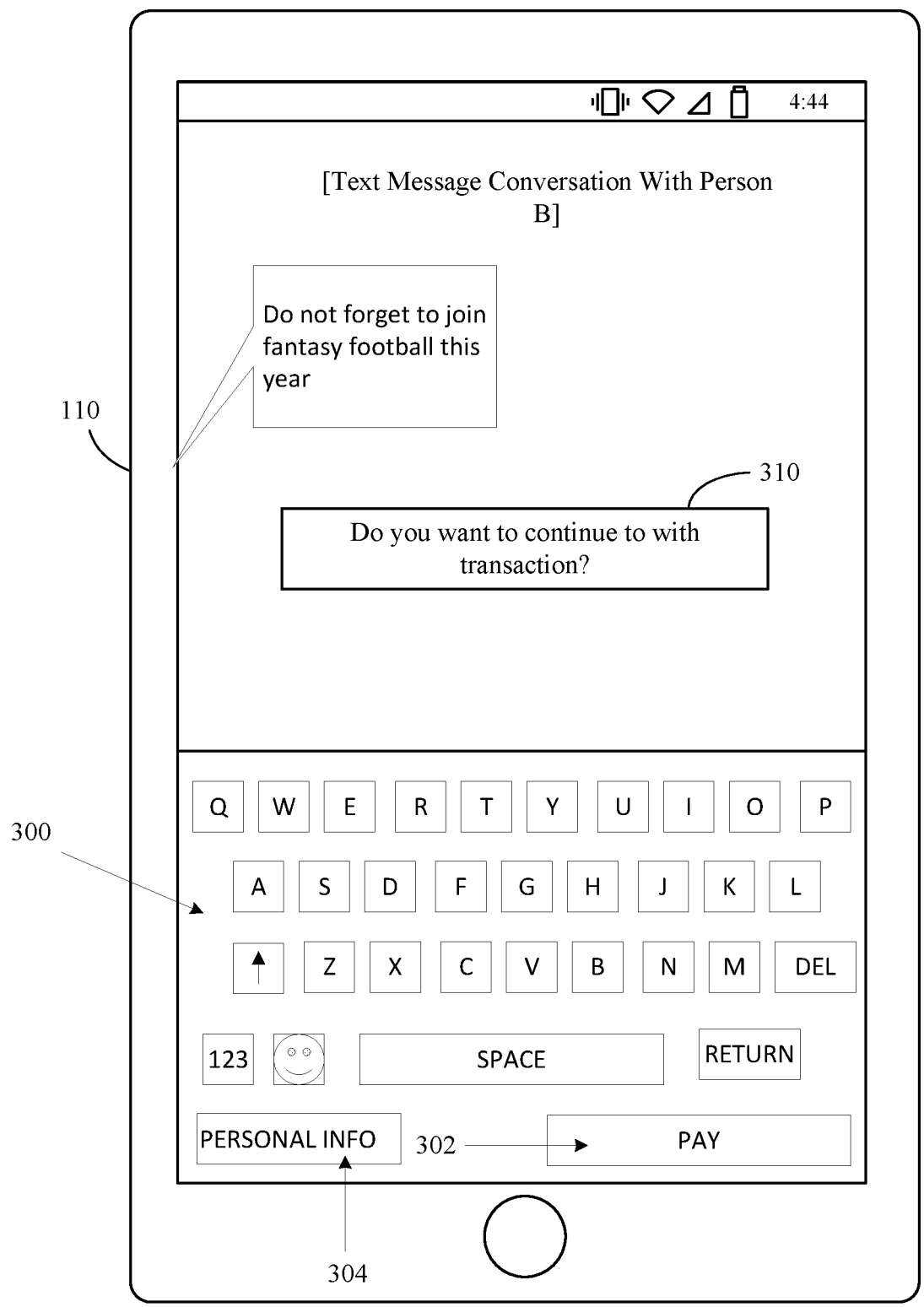
FIG. 3 is a keyboard graphical user interface provided by the transactional keyboard client application of FIGS. 1-2 on the user mobile device, according to an example embodiment.
Figure 4:
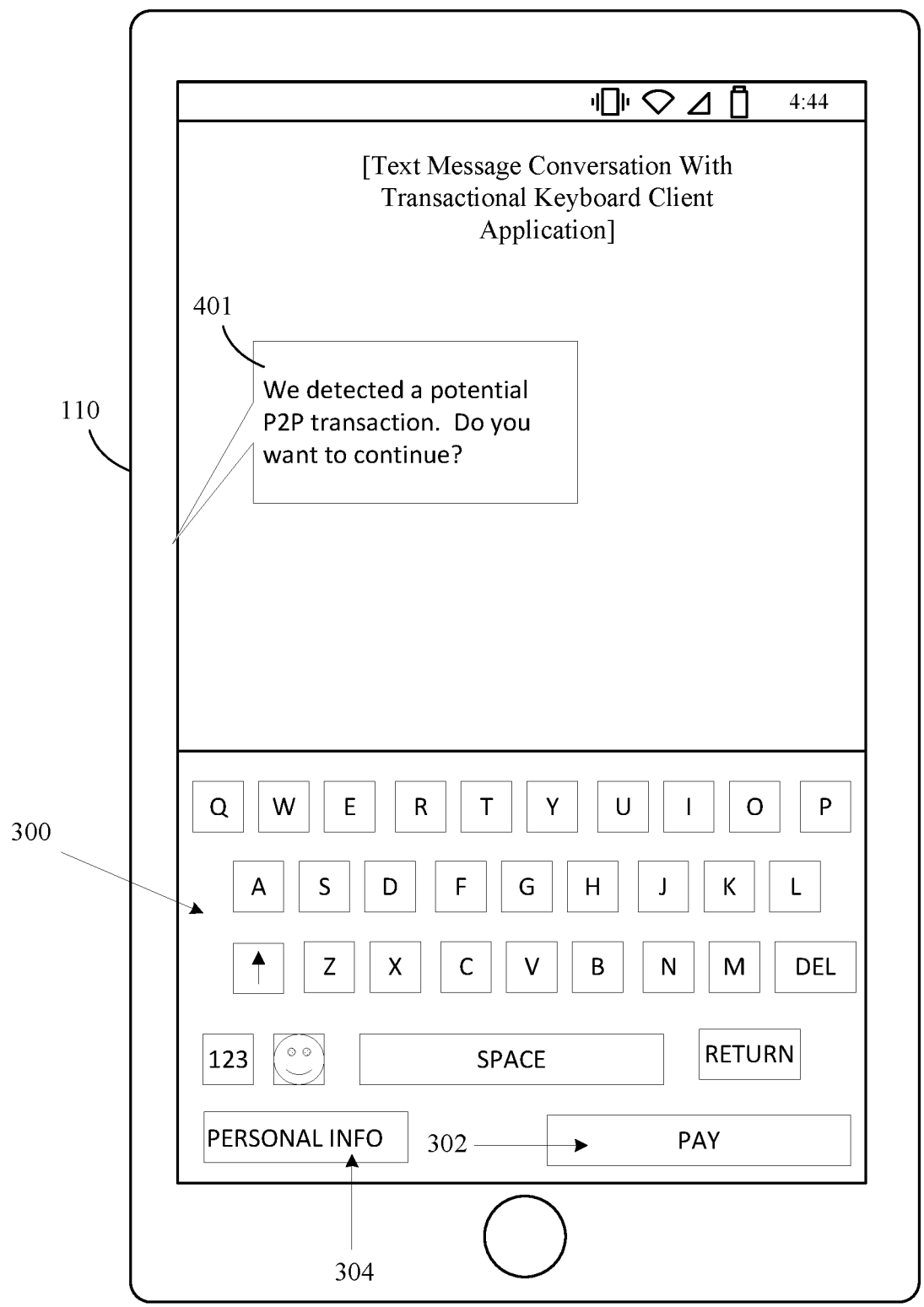
FIG. 4 is a keyboard graphical user interface provided by a transactional keyboard client application of FIGS. 1-2 on the user mobile device, according to another example embodiment.

In some embodiments, the transactional keyboard client application 140 may also be configured to recognize a plurality of fields (e.g., name, address, phone number, email, transaction amount, etc.) of a digital form being displayed on the user device 110 (e.g., within a web browser) and configured to form fill the form based on field recognition. For example, the user may access a webpage on a web browser, or open a digital document including a plurality of fields. The registration circuit 144 may identify the plurality of fields based on field recognition and automatically form fill the fields. In other arrangements, the keyboard GUI 300 may also include a personal information icon 304, as shown in FIGS. 3-4. The user may select or engage the personal information icon 304 which may cause the transactional keyboard client application 140 to display at least one user profile associated with the user via the keyboard GUI 300. The user may select a particular user profile of the at least one user profile, and the registration circuit 144 may form fill the plurality of fields with information corresponding to the selected user profile.

While initiation and completion of the transaction is described above with respect to providing one or more pop-up or other screens (e.g., GUIs), it should be understood that other ways of completing the transaction are contemplated. For example and with respect to the keyboard GUI 300 being provided and used for text messages, a text message conversation may be utilized. The text message conversation may be provided as a separate text message conversation or as a side text message conversation from within an existing text messaging conversation. In operation and by way of example, after a peer-to-peer transaction is determined, the transaction interface 143 may provide a text message to the mobile device 120 that asks "Would you like to proceed with a peer-to-peer transaction to this recipient?" Thus, a smart interface via the text messages may be provided so that the user can truly stay within the text message conversation to complete this peer-to-peer transaction. A similar process may be implemented with mobile wallet transactions where the transactional keyboard client application 140 may inquire, and conducts a conversation with the user.

FIG. 4 depicts a text message conversation that may be utilized to commence and complete the transaction. As shown, conversation 401 represents the transaction conversation, which is used to confirm or deny the transaction. The transaction conversation 401 represents the output of a chatbot or another chat generator that is initiated upon the user selecting the transaction icon, thereby allowing the transaction to proceed or end. In this example, the initiation of the transaction is provided from within a text messaging application. Of course, it is contemplated that the transaction is initiated within the application that is currently using the keyboard GUI 300. Further, in some embodiments, the transaction conversation 401 is provided from within the existing conversation. In either situation, a conversation is utilized to confirm that the user would like to proceed with the transaction.

In an alternate embodiment, clicking on the pay icon 302 may automatically perform the identified transaction without additional user interactions. This configuration avoids the pop-up or additional screens and the text messaging conversation to initiate and complete the transaction. Such a configuration may be implemented across all transactions or certain predefined transactions. For example, the user may specify that only mobile wallet transactions occur without additional confirmations required.

The user may also specify the type of transaction desired, such as mobile wallet or peer-to-peer or deposit, if this determination was not previously made or previously made correctly. Further, in some alternative embodiments, a "light" version of the transactional keyboard client application 140 may be provided (e.g., a free version, or lower cost version) that does not include the smart capabilities described above that are utilized to identify the type of transaction. In this configuration, the user may be required to affirmatively enter the type of transaction utilized so that the transactional keyboard client application 140 can communicate with the relevant application or applications to initiate and complete the transaction.

Referring now to FIG. 5, a flow diagram of a method 500 of providing a transactional keyboard client application (e.g., the transactional keyboard client application 140) and utilizing same is described according to an example embodiment. Method 500 may be performed using the transactional keyboard client application 140 and transactional keyboard circuit 141, such that reference may be made to these components in the method 500. As described above, in some embodiments, at least certain capabilities of the transactional keyboard client application 140 may be provided in the transactional keyboard circuit 141, such that those of ordinary skill in the art that various functions may be implemented with the transactional keyboard circuit 141 as compared to the client application. For example, the client application may be a thin client where all or mostly all of the functions are provided by the transactional keyboard circuit 141. Thus, those of skill in the art will appreciate that the methods described below may be equally applicable with the transactional keyboard circuit 141.

At operation 501, registration information is received in order to register a user with the transactional keyboard client application 140. Registration information may include information regarding the user (e.g., date of birth, name, address, etc.). Registration information may also include security credentials or other passcodes for use with other applications disposed on the user's device (e.g., the security credentials to access the mobile wallet client application 130, mobile banking client application, text messaging application, internet browser, etc.). Registration information may further include preferences for operation of the transactional keyboard client application 140. For example, the preferences may define when the keyboard is used, when the keyboard with the transaction icon is used, etc. Beneficially, the transaction icon may only be implemented in certain user-defined situations to control the frequency of its usage. Further, security protocols may be defined that prescribe how a transaction is initiated after the transaction icon is selected. Beneficially, such a configuration may alleviate inadvertent undesired transactions.

At operation 502, the transactional keyboard client application 140 is registered and coupled to one or more other applications based on the registration information. Registration may include storing the user's registration information and preferences regarding operation thereof in the transactional keyboard circuit 141 and/or the registration circuit 144.

At operation 503, a potential transaction is determined. In this case, the transactional keyboard client application 140 may include smart capabilities (described above) that predict, estimate, or otherwise determine a transaction is likely as well as the type of transaction. Beneficially, this enables the transactional keyboard client application 140 to quickly communicate, via one or more APIs, with the relevant application (e.g., mobile banking application) to enable the predicted or determined transaction when confirmed to occur quickly (e.g., deposit funds). In another embodiment, this smart feature is not included with the application, which may slow the transaction down but potentially decrease memory requirements for the transactional keyboard client application 140.

At operation 504, a transaction indication is received. In other words, the transaction icon (e.g., the pay icon 302 is selected or chosen. Thus, the user has provided an affirmation indication that they want to proceed with a transaction. At this point, the type of transaction may also need to be specified by the user. In the smart configuration, the type of transaction may be provided as an indication when the user clicks or selects the icon. For example, the type of transaction may be indicated textually or visually (e.g., a graphic or icon) on the transaction icon. As an example, once a mobile wallet transaction is determined (operation 503), the mobile wallet icon or textual words regarding same may be provided on the transaction icon. Thus, when the user selects that icon, he/she has made a decision to proceed with the mobile wallet transaction. Of course, the keyboard GUI may include another button (not shown) where a user can change the transaction type (e.g., an icon that says change transaction type). As still another example embodiment, all or mostly all the transaction types may be provided as separate buttons on the keyboard GUI. This configuration may be implemented with the non-smart application (e.g., mobile wallet transaction, deposit transaction, peer-to-peer (P2P) transaction, etc.). Upon selection of the button, the transaction interface 143 may call or communicate on the relevant application associated with that button. Beneficially, in the smart configuration, relatively less buttons/icons may be utilized which provide a more streamlined and clean look. However, some users may prefer the icon-for-each-transaction-type configuration, for example, due simplicity of use.

At operation 505, the transaction is facilitated and completed. This may be done automatically in a one-quick fashion. Or, in another embodiment, this may be done via one or more additional screens, text transaction conversations 401, etc. that may or may not include the request for additional security credentials to further selectively prohibit and permit the transaction. The transaction itself may then be completed via the application associated with the function (e.g., the mobile wallet application to perform a mobile wallet transaction; the mobile banking application to perform a deposit; the P2P application to perform a peer money transfer; etc.).

Beneficially, the method 500 enables the user to complete a transaction from use of the keyboard GUI. This configuration may save time, provide a better user experience, and otherwise improve the communication relationships between the applications that may be utilized to actually complete the transaction. Further and due to the connectivity, the transaction may be connected in real time or near real time. The transactional keyboard may be structured to interact and/or communicate with one or more operating systems such as, but not limited to, an Android, iOS, or other operating system. The adaptable and transactional keyboard may be structured to engage with a short message service (SMS) message, in-app message, application interface, etc. For example, the transactional keyboard client application 140 may be communicatively coupled to, included within, or otherwise associated with a short message service (SMS) message application, application interface, etc. As the user device 110 transmits and/or receives signals from, for example, a cellular tower, control channel, etc., the control channel may map a path for the message (e.g., the SMS, text message, etc.).

As an example of completion of the transaction of method 500 (using the transactional keyboard client application 140), a digital payment may be provided via the mobile wallet client application 130 using a certain transmission technology, such as near-field communication (NFC). As described above with respect to the mobile wallet client application 130, the user device 110 may include one or more circuits, programmatic instructions, NFC device, and/or other hardware components structured to communicate by NFC communication protocols. The user may hold, tap, and/or swipe the user device 110 to make a purchase, send funds, send a payment, and/or carryout a transaction via a contactless payment. In some arrangements, a NFC device of the user device 110 may be read by a provider card reader, NFC-enabled terminal, etc. The user may utilize one or more accounts associated with the digital payment application (e.g., digital wallet) for payment. In some examples, the user device 110 may be within a predetermined range (e.g., within a minimum and/or a maximum number of centimeters) of the provider card reader, NFC-enabled terminal, and/or another user device 110 (e.g., a NFC enabled device) such that user device 110 may communicate with (e.g., transmit and/or receive data) each respective device. For example, while in the predetermined range, a provider card reader may detect and register a magnetic field associated with NFC device of the user device 110. In turn, the provider card reader may decode and/or translate waves resulting from the magnetic field into data (e.g., transaction data) to cause a digital payment.

As another example of completion of the transaction of method 500, utilizing a peer-to-peer network one or more user devices 110 may be structured for NFC communication such that a digital application feature may be activated between the one or more user devices 110. In such arrangements, photos, documents, contacts, videos, digital payments, transaction data, and/or other digital content may be transferred from one user device 110 to another user device 110 by tapping them together without opening the digital payment application (e.g., digital wallet) and/or selecting, tapping, or utilizing a send button, icon, image, link, or other like options.

In some examples, a user may be authenticated into an application (i.e., mobile wallet client application 130) as an account holder before use of the transactional keyboard client application 140. The user device 110 may be structured to authenticate engagement with the digital payment application based on a customer device token. The customer device token may be structured to allow and/or prevent access to the digital payment application, or any other restricted resource associated with an account of a customer. The customer device token may include a cryptographic key (e.g., a digital signature, authentication credentials, biometric data, etc.). The customer device token may include a unique identifier associated with the user device 110 and/or the account of a customer (e.g., the user 101). In some examples, the customer device token may take the form of a hardware token and/or a software token (e.g., a soft token). The customer device token may be uniquely associated with the user of the user device 110. In some examples, the customer device token may generate an authentication code according to a period of time (e.g., a fixed interval of time, random interval of time, etc.). The customer device token may be embedded in the user device 110 or it may be included in the provider institution computing system 172, a cloud structured system, a backend server, or in any other suitable device.

Alternatively or a additionally, the user may be authenticated based on the authentication credentials of the user such that the customer device token may be used in addition to or in place of a password. The user device 110 receives and transmits user authentication data (e.g., data indicative of the identity of a user of the provider institution 170 and/or a user of various systems, applications, and/or products of the provider institution 170) to the provider institution computing system 172. In such arrangements, the user can be identified and authenticated based on the application associated with the provider institution computing system 172 such that the provision of additional identification information or account information by the user is not required. The user authentication data includes any of a password, a PIN (personal identification number), a user ID, an answer to a verification question, a biometric, an identification of a security image, or a combination thereof.

The provider institution computing system 172 (or computing system associated a third party application) may compare the received customer device token, authentication data, etc. with known and verified customer device tokens, user authentication data, etc. If the customer device token and/or the authentication data provided does not match the known and verified customer device tokens, user authentication data, etc., the user is not authenticated and the functional feature of the application feature (e.g., mobile wallet, third party, etc.) may not be activated (e.g., initiated, completed, etc.). If the customer device tokens, user authentication data, etc. provided matches the known and verified user customer device tokens, user authentication data, etc., the user is authenticated.

The user may need to provide funds, make a payment, or otherwise send funds to the recipient. In response to the user clicking, tapping, or making contact with one or more key of the keyboard GUI 300 generated by the transactional keyboard client application 140 (e.g., the pay icon 302), the transaction may be initiated and completed. In some arrangements, the transaction icon may be words, phrases, or characters (verbal or textual). For example, as the user types "I will pay you," "I am going to send money to you," "send money," "$25," or other like words and/or phrases, the transactional keyboard client application 140 may recognize that the user may be engaged in a transaction based on the user input received. As mentioned above, specific keys may be the transaction icon, which include, but are not limited to, a "pay now," "transfer funds," "send money," or other like key, button, icon, etc.

In some arrangements, the transactional keyboard client application 140 may be structured to form fill a digital form (e.g., an ecommerce checkout form) according to field recognition via coupling to the internet browser and using registration information. The registration circuit 144 may receive data (e.g., user data, account data, transaction data, etc.) included within, accessible by, and/or provided by the digital application (e.g., a digital wallet) and/or the provider institution computing system 172. For example, when a user accesses an ecommerce checkout form, the registration circuit 144 (based on selection of the transaction icon) may automatically populate one or more fields with user account data (e.g., the name and address of the user) and/or transaction data (e.g., payment amount, credit card data, etc.).

The transaction interface 143 may be structured to activate a digital application feature comprising a custom message. The custom message may include, for example, the current website, web page, etc. that the user device 110 is outputting. For example, the custom message may include the current website the user is accessing or is otherwise displayed by the user device 110. In some examples, the custom message may include previous websites associated with the user device 110. For example, custom message may include recent websites accessed or visited by the user of the user device 110. In further examples, the custom message may include information, offers, and/or products relevant to and/or associated with the website accessed by the user device 110.

Figure 6B:
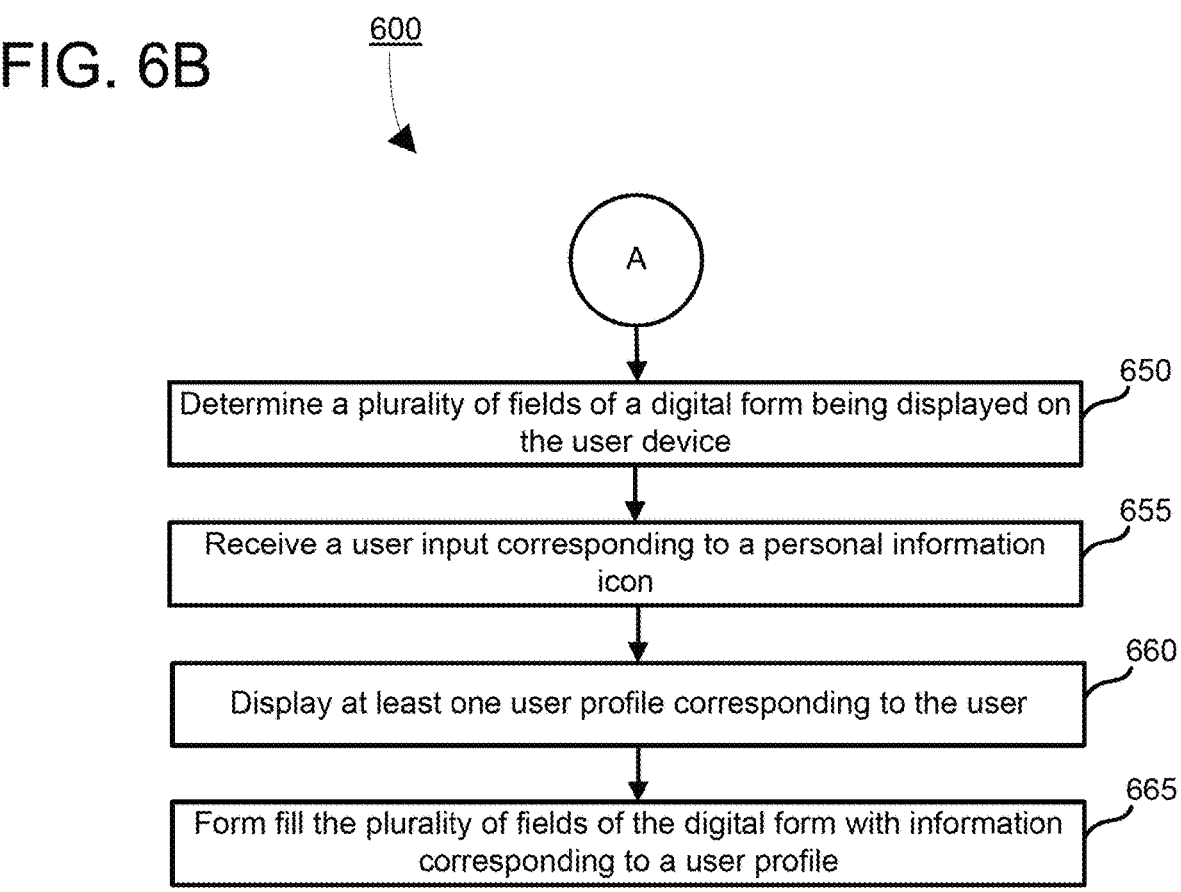

FIGS. 6A and 6B are schematic flow diagrams illustrating a method 600 for initiating a digital transaction by the transactional keyboard client application 140, according to a particular arrangement. The method 600 may include initiating a digital transaction on the user device 110 associated with a user without accessing a digital payment application (e.g., the mobile wallet client application 130) of the user device 110. The method 600 may be implemented with the user device 110 or any other user device described herein.

In some arrangements, the method 600 includes receiving registration information associated with the user by the user device 110, at 605. For example, the transactional keyboard circuit 141 of the provider institution 170 may communicate a request to the user device 110 requesting the user to register in a transactional keyboard client application program. The user may provide registration information associated with user (e.g., personal information corresponding to the user, user name, password, one or more applications of the user device 110 to associate the transactional keyboard client application 140 with, etc.) to the provider institution computing system 172 (e.g., the transactional keyboard circuit 141) via the user device 110, which may cause the transactional keyboard client application 140 to be installed on the user device 110.

The user device 110 associates the transactional keyboard client application 140 with at least one application on the user device 110 based on the registration information, at 610. For example, the one or more applications installed on the user device 110 indicated by the user during the registration process for associating the transactional keyboard client application 140 with such that the transactional keyboard client application 140 may engage the one or more applications. In various arrangements, transactional keyboard client application 140 is structured to engage with at least one of a short message service (SMS) message, an application interface, a web browser or an electronic document. In some arrangements, the SMS message may comprise a message based on tracked site data, transaction data, or a combination thereof, and the transactional keyboard client application 140 may be structured to generate the message.

At 615, a keyboard GUI associated with the transactional keyboard client application 140 is displayed on the user device 110. The keyboard GUI comprises at least a transaction icon. For example, the keyboard GUI 300 which includes the pay icon 302 is displayed on the user device 110 when the user access an application (e.g., an SMS message, an application interface, a web browser and/or an electronic document) on the user device 110.

At 620, the transactional keyboard client application 140 receives a user input associated with the transaction icon via the keyboard GUI. For example, the user may be using the keyboard GUI 300 while accessing an application (e.g., while messaging using a SMS service), and engages (e.g., clicks or selects) the pay icon 302 of the keyboard GUI 300.

In particular arrangements, the transactional keyboard client application 140 receives at least one knowledge factor associated with a user prior to initiating the digital transaction, at 625. For example, in response to the user engaging the pay icon 302, the transactional keyboard client application 140 may prompt the user to enter the secret knowledge factor (e.g., a PIN, a password, or a biometric sample such as a thumbprint, a facial recognition knowledge factor, an retina recognition knowledge factor, a speech pattern, a DNA sample, a foot movement pattern, a hand gesture or any other suitable biometric sample or a combination thereof).

At 630, the transactional keyboard client application 140 (e.g., the registration circuit 144 of the transactional keyboard client application 140) determines if the secret knowledge factor matches a stored knowledge factor (e.g., a knowledge factor such as a password or biometric sample provided by the user during a registration process). In other arrangements, the transactional keyboard client application 140 may communicate the secret knowledge factor to the mobile wallet client application 130 (e.g., via a communication API) and/or the transactional keyboard circuit 141 of the provider institution computing system 172 for matching with the stored knowledge factor.

If the secret knowledge factor does not match the stored knowledge factor (630:NO), the method 600 returns to operation 620, and the user may be requested to reenter the secret knowledge factor. In particular arrangements, if the user enters an incorrect knowledge factor for a predetermined number of times (e.g., 3, 4, 5, 10 or any other suitable number), the transactional keyboard client application 140 may lock the user out of the application, or otherwise stop processing the transaction. In response to the at least one secret knowledge factor matching a stored knowledge factor (630:YES), the transactional keyboard client application 140 (or alternatively, the mobile wallet client application 130) authenticates the user, at 635. In some arrangements, the transactional keyboard client application 140 may be configured to authenticate the user via an engagement with the digital payment application (e.g., the mobile wallet client application 130) based on a customer device token, for example, to perform a device binding authentication to bind or associate the mobile device 120 with the user 101.

At 640, the transactional keyboard client application 140 activates a digital payment feature of a digital payment application (e.g., included in the mobile wallet client application 130) associated with the user device 110. For example, the transactional keyboard client application 140 may communicate with the mobile wallet client application 130, for example, via an API or any other communication interface, and activate the digital payment feature of the digital payment application included in the mobile wallet client application 130. In various arrangements, the digital application feature comprises at least one of a payment feature, a pre-purchase feature, a post-purchase feature or a voice input feature.

At 645, the transactional keyboard client application 140 initiates a digital transaction without the digital payment application being accessed by the user. For example, the user may engage the pay icon 302 on the keyboard GUI 300 while using the keyboard GUI 300 in a third party application (e.g., an SMS message, a web browser, a digital document or any application), or otherwise indicate that the user wants to initiate a digital transaction (e.g., a digital payment), for example, via a voice recognition feature of the user device 110. If the user is authenticated, the transactional keyboard client application 140 may be configured to communicate with the digital payment application (e.g., the mobile wallet client application 130) and automatically activate the digital payment feature so as to initiate the transaction (e.g., a digital payment, funds transfer, etc.) without the user opening or otherwise accessing the digital payment application (e.g., the mobile wallet client application 130). In various arrangements, the transactional keyboard client application 140 may be configured to generate the digital transaction within an SMS message. In such arrangements, the transactional keyboard client application 140 may be configured to provide the digital transaction via the SMS message to an account associated with a recipient according to a peer-to-peer network.

In some arrangements, the method 600 may also include determining, by the transactional keyboard client application 140, a plurality of fields of a digital form being displayed on the user device 110, at 650. For example, the user may open a digital form (e.g., a webpage displaying a digital form or an electronic document) and the transactional keyboard client application 140 may be configured to determine or identify the plurality of fields included in the digital form. At 665, the transactional keyboard client application 140 may form fill the plurality of fields of the digital form based on field recognition, for example, using personal information corresponding to the user which may be stored on the user device (e.g., the stored in the registration circuit 144 of the transactional keyboard client application 140).

In some arrangements, the keyboard GUI 300 may also include a personal information icon (e.g., the personal information icon 304). In such arrangements, the transactional keyboard client application 140 may receive a user input corresponding to the personal information icon, at 655 prior to form filling the plurality of fields of the digital form. At 660, the transactional keyboard client application 140 may display at least one user profile corresponding to the user on the user device 110. For example, the user may have provided more than one user profile corresponding to the user during the registration process (e.g., at operation 605) with the transactional keyboard client application 140. In response to the user engaging the personal information icon, the transactional keyboard client application 140 may be configured to display the at least one user profile on the user device 110 (e.g., within the keyboard GUI 300). The transactional keyboard client application 140 may be configured to form fill the digital form with information corresponding to the user profile of the at least one user profile selected by the user at operation 665. For example, the transactional keyboard client application 140 may display one or more user profiles corresponding to the user on the user device 110 (e.g., within the keyboard GUI 300). The user may select a particular user profile including a set of information specific to that user profile, and the transactional keyboard client application 140 may form fill the digital form with the information included in the user profile selected by the user.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A user device comprising:
    a digital payment application;
    a contactless chip comprising a secure element, the contactless chip coupled to the digital payment application and configured to transfer data to and receive data from a near-field communication (NFC) enabled terminal, wherein the secure element stores user payment information on the user device; and
    a transactional keyboard client application communicatively coupled to the digital payment application, the transactional keyboard client application structured to:
        generate and display an alphanumeric keyboard graphical user interface on the user device in response to activation of a messaging application, a web browser application, or an electronic document;
        determine a transaction type based on contextual information including a location of the user device at a merchant location of a merchant;
        provide, via the generated alphanumeric keyboard graphical user interface and based on the determined transaction type, an indication of the determined transaction type and a selectable transaction icon, wherein the selectable transaction icon is dynamic based on the determined transaction type;
        receive a user input associated with one or more keys of the generated alphanumeric keyboard graphical user interface during usage of the messaging application, the web browser application, or the electronic document, the user input including a selection of the selectable transaction icon that indicates an approval to proceed with a contactless digital transaction based on the determined transaction type;
        receive at least one secret knowledge factor associated with a user prior to initiating the contactless digital transaction, wherein the at least one secret knowledge factor includes a biometric;
        communicate, via a communication application programming interface (API), the received at least one secret knowledge factor to the digital payment application;
        in response to receiving an indication from the digital payment application that the at least one secret knowledge factor matches a stored knowledge factor, authenticate the user, the authentication enabling the transactional keyboard client application to initiate the contactless digital transaction;
        communicate with the digital payment application and the contactless chip of the user device based on the determined transaction type and the user input without opening the digital payment application; and
        initiate the contactless digital transaction using the contactless chip and the digital payment application with the merchant without opening the digital payment application, wherein initiating the contactless digital transaction causes the contactless chip to receive a communication from an NFC-enabled merchant device and transfer user payment information to the NFC-enabled merchant device.

2. The user device of claim 1, wherein the selectable transaction icon comprises the indication of the determined transaction type.

3. The user device of claim 1, wherein the contactless digital transaction is initiated in response to the user input associated with the selectable transaction icon.

4. The user device of claim 1, wherein the digital payment application is structured to form fill a digital form according to field recognition.

5. The user device of claim 4, wherein the one or more keys comprise a personal information icon, the transactional keyboard client application further configured to:
    display at least one user profile corresponding to the user in response to a user input associated with the personal information icon; and
    automatically form fill a digital form based on a user profile of the at least one user profile selected by the user.

6. The user device of claim 5, wherein the transactional keyboard client application is further configured to:
    receive another at least one secret knowledge factor prior to form filling the at least one user profile; and
    in response to the another at least one secret knowledge factor matching another stored knowledge factor, authenticate the user, the authentication enabling the transactional keyboard client application to form fill the digital form with the selected user profile.

7. The user device of claim 1, wherein the user device is structured to authenticate engagement with the digital payment application based on a customer device token.

8. The user device of claim 1, wherein the messaging application comprises a message that is based on tracked site data, transaction data, or a combination thereof, and wherein the transactional keyboard client application is structured to generate the message.

9. A computer implemented method of providing a digital application feature via a transactional keyboard client application, the method comprising:
    authenticating a user device associated with a digital payment application, the user device comprising a contactless chip coupled to the digital payment application and configured to transfer data to and receive data from a near-field communication (NFC) enabled terminal, the contactless chip storing user payment information on the user device;
    generating and displaying an alphanumeric keyboard graphical user interface on the user device in response to activation of a messaging application, a web browser application, or an electronic document;

determining a transaction type based on contextual information including a location of the user device at a merchant location of a merchant;
providing, via the generated alphanumeric keyboard graphical user interface and based on the determined transaction type, an indication of the determined transaction type and a selectable transaction icon, wherein the selectable transaction icon is dynamic based on the determined transaction type;
receiving a user input associated with one or more keys of the generated alphanumeric keyboard graphical user interface during usage of the messaging application, the web browser application, or the electronic document, the user input including a selection of the selectable transaction icon that indicates an approval to proceed with a contactless digital transaction based on the determined transaction type;
receiving at least one secret knowledge factor associated with a user prior to initiating the contactless digital transaction, wherein the at least one secret knowledge factor includes a biometric;
communicating, via a communication application programming interface (API), the received at least one secret knowledge factor to the digital payment application;
in response to receiving an indication from the digital payment application that the at least one secret knowledge factor matches a stored knowledge factor, authenticating the user, the authentication enabling the digital application feature to initiate the contactless digital transaction;
communicating with the digital payment application and the contactless chip of the user device based on the determined transaction type and the user input without opening the digital payment application; and
initiating the contactless digital transaction using the contactless chip and the digital payment application with the merchant without opening the digital payment application, wherein initiating the contactless digital transaction causes the contactless chip to receive a communication from an NFC-enabled merchant device and transfer the user payment information to the NFC-enabled merchant device.

10. The computer implemented method of claim 9, and wherein the contactless digital transaction is initiated in response to the user input associated with the selectable transaction icon.

11. The computer implemented method of claim 9, wherein the selectable transaction icon comprises the indication of the determined transaction type.

12. The computer implemented method of claim 11, further comprising form filling a digital form according to field recognition.

13. The computer implemented method of claim 12, wherein the one or more keys comprise a personal information icon, and wherein the method further comprises:
displaying at least one user profile corresponding to the user in response to a user input associated with the personal information icon,
wherein the digital form is form filled based on a user profile of the at least one user profile selected by the user.

14. The computer implemented method of claim 13, further comprising:
receiving another at least one secret knowledge factor prior to displaying the at least one user profile; and
in response to the another at least one secret knowledge factor matching another stored knowledge factor, authenticating the user, the authentication enabling form filling of the digital form with the selected user profile.

15. A method, comprising:
generating and displaying, on a user device associated with a user, an alphanumeric keyboard graphical user interface associated with a transactional keyboard client application, the alphanumeric keyboard graphical user interface generated and displayed in response to activation of a messaging application, a web browser application, or an electronic document, wherein the alphanumeric keyboard graphical user interface comprises a selectable transaction icon;
determining, by the transactional keyboard client application, a transaction type based on contextual information including a location of the user device at a merchant location of a merchant or activation of the messaging application, the web browser application, or the electronic document;
providing, by the transactional keyboard client application and based on the determined transaction type via the generated alphanumeric keyboard graphical user interface, an indication of the determined transaction type and the selectable transaction icon, wherein the selectable transaction icon is dynamic based on the determined transaction type;
receiving, by the transactional keyboard client application via the generated alphanumeric keyboard graphical user interface during usage of the messaging application, the web browser application, or the electronic document, a user input associated with the selectable transaction icon that indicates an approval to proceed with a contactless digital transaction based on the determined transaction type;
receiving, by the transactional keyboard client application, at least one secret knowledge factor associated with the user prior to initiating the contactless digital transaction, wherein the at least one secret knowledge factor includes a biometric;
communicating, via a communication application programming interface (API), the received at least one secret knowledge factor to a digital payment application;
in response to receiving an indication from the digital payment application that the at least one secret knowledge factor matches a stored knowledge factor, authenticating the user, the authentication enabling the transactional keyboard client to initiate the contactless digital transaction;
communicating, by the transactional keyboard client application, with the digital payment application associated with the user device and a contactless chip of the user device based on the determined transaction type and the user input without the digital payment application being opened by the user, the contactless chip coupled to the digital payment application and storing user payment information on the user device, the contactless chip configured to transfer data to and receive data from a near-field communication (NFC) enabled terminal; and
initiating, by the transactional keyboard client application via the digital payment application, the contactless digital transaction using the contactless chip and the digital payment application with the merchant without the digital payment application being opened by the user, wherein initiating the contactless digital transaction causes the contactless chip to receive a communication from an NFC-enabled merchant device and transfer the user payment information to the NFC-enabled merchant device.

16. The method of claim 15, further comprising:
receiving, by the transactional keyboard client application, registration information associated with the user; and
associating, by the transactional keyboard client application, the transactional keyboard client application with at least one application on the user device based on the registration information.

17. The method of claim 15, wherein the selectable transaction icon comprises the indication of the determined transaction type.

18. The method of claim 15, further comprising:
authenticating, by the transactional keyboard client application, an engagement with the digital payment application based on a customer device token.

19. The method of claim 15, further comprising;
determining, by the transactional keyboard client application, a plurality of fields of a digital form being displayed on the user device; and
form filling, by the transactional keyboard client application, the plurality of fields of the digital form based on field recognition.

20. The method of claim 19, wherein the alphanumeric keyboard graphical user interface further comprises a personal information icon, and wherein the method further comprises:
receiving, by the transactional keyboard client application prior to form filling the plurality of fields, a user input corresponding to the personal information icon; and
displaying, by the transactional keyboard client application on the user device, at least one user profile corresponding to the user,
wherein the plurality of fields are form filled with information corresponding to a user profile of the at least one user profile selected by the user.

21. The method of claim 15, wherein the messaging application comprises a message that is based on tracked site data, transaction data, or a combination thereof, and wherein the transactional keyboard client application is structured to generate the message.

\* \* \* \* \*